2 Sheets--Sheet 1.

J. D. GRAY.

Stand Oil-Can.

No. 6,396. Reissued April 20, 1875.

Witnesses;

Jas. F. Duhamel.

Thomas Byrne.

Inventor;

John D. Gray

Per H. S. Abbot.

Attorney.

J. D. GRAY.

Stand Oil-Can.

No. 6,396. Reissued April 20, 1875.

Witnesses;

Jas. J. Duhamel.

Thomas. Byrne.

Inventor;

John D. Gray.

Per H. S. Abbot.

Attorney.

UNITED STATES PATENT OFFICE.

JOHN D. GRAY, OF CINCINNATI, OHIO.

IMPROVEMENT IN STAND OIL-CANS.

Specification forming part of Letters Patent No. 100,393, dated March 1, 1870; reissue No. 6,396, dated April 20, 1875; application filed January 27, 1875.

*To all whom it may concern:*

Be it known that I, JOHN D. GRAY, of Cincinnati, in the county of Hamilton and State of Ohio, have invented certain new and useful Improvements in Oil-Cans; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to what are known as stand-cans for holding oil for supplying smaller cans or other vessels; and the nature of my invention consists in an entirely open-mouthed can with a removable top, having a sink attached, said top and sink being adapted to fit down and close the mouth of the can; also, in combination with said top and sink, of a stand-pipe having interior screw-threads and a pump-barrel screwed therein. It also consists in the combination of an oil-can and an interior lever-handle pump, all as hereinafter more fully set forth.

In order to enable others skilled in the art to which my invention appertains to make and use the same, I will now proceed to describe its construction and operation, referring to the annexed drawings, which form a part of this specification, and in which—

Figure 1:
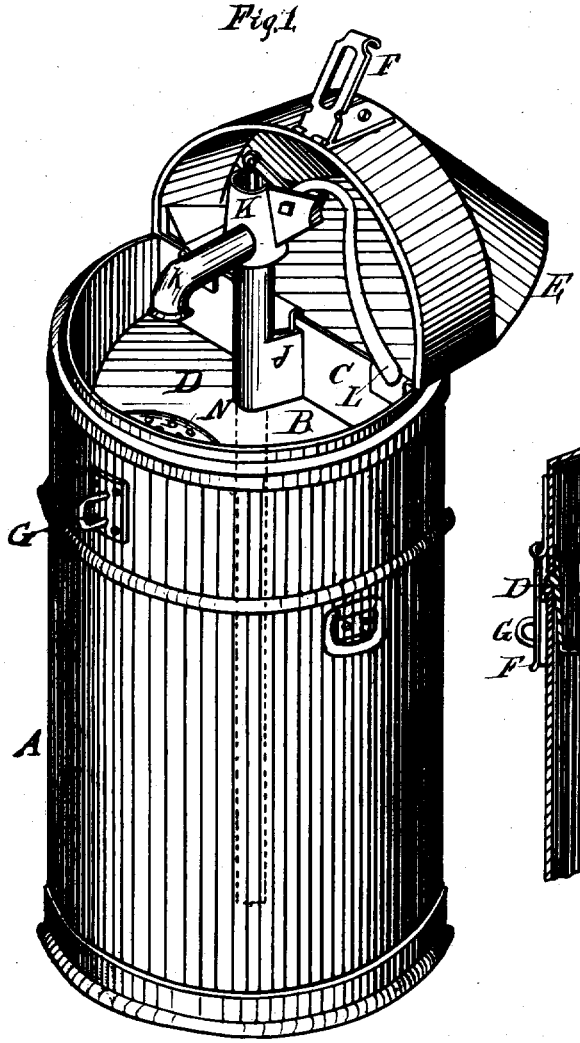
Figure 2:
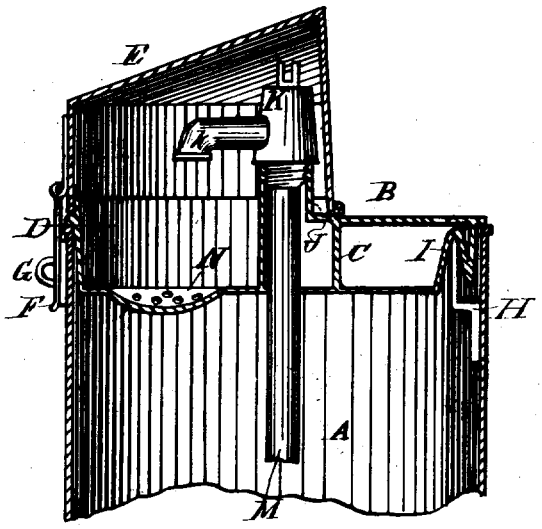
Figure 4:
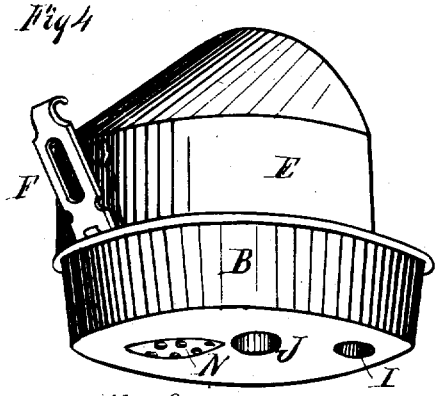
Figure 3:
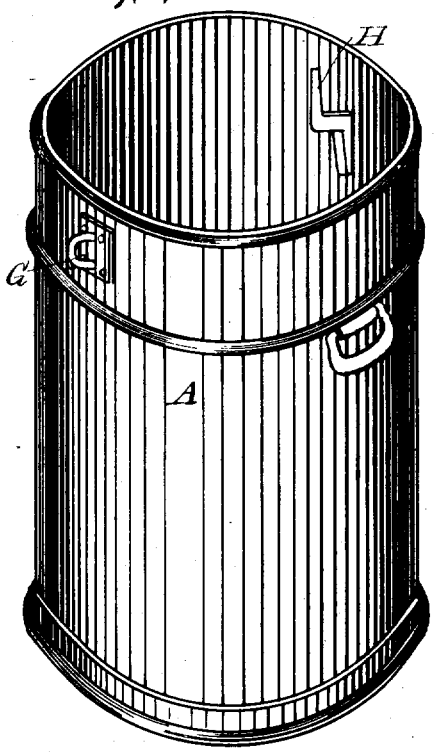
Figure 5:
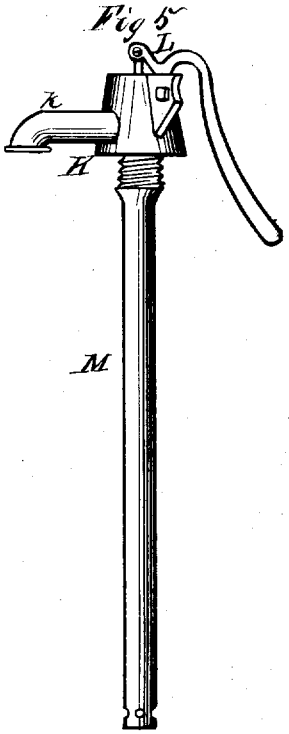

Figure 1 is a perspective view of a can embodying my invention, the cover being thrown open. Fig. 2 is a vertical section of the same with the cover closed. Figs. 3 and 4 show the reservoir and top detached. Fig. 5 shows the pump detached.

A represents a reservoir or can of any suitable dimensions, having an entirely open mouth, which, when in use, is closed by a top, B, made in the shape of a pan having a sink, N, formed in the bottom thereof. This top, with sink, fits down into and closes the mouth of the can, and it is divided by a vertical partition, C, into two unequal compartments, the larger one, D, of which is open, as shown, but capable of being closed by a box-cover, E. This cover is hinged to the top B, immediately over the partition C, and its lower edge closes down outside the rim of the compartment D. The cover E, when down, is fastened by means of a hasp, F, attached to it, fitting over a staple, G, on the can. In order that the hasp may always come right with the staple, the top B is provided with a conical socket, I, which fits over a pin, H, projecting from the inside of the can, thereby guiding the top accurately to its place. At or near the center of the top B rises a stand-pipe, J, provided with female or interior screw-threads for the reception of the lower end of the pump-barrel K, which is provided with exterior screw-threads and screwed into the same. The barrel K is provided with a spout, *k*, directly over the sink N, said sink conducting the drippings of the vessels being filled back into the can. To the lower end of the pump-barrel K is soldered, or otherwise firmly attached, the suction-pipe M. To ears on the side of the pump-barrel is pivoted the lever L, the inner end of which is connected to the plunger of the pump. By lifting the top the interior of the can is rendered accessible for cleaning or otherwise, and the same top, with its appurtenances, may be shifted to another can when desired.

Having thus fully described my invention, what I claim as new, and desire to secure by Letters Patent, is—

1. The oil-tank A, provided with a removable sunken top compartment having provision for the oil-drawing device, and adapted to be set into the mouth of the can, substantially as described.

2. The combination, with an open-mouthed oil-can and removable top, of a stand-pipe, J, rising from the top, and provided with interior screw-threads, and a pump-barrel, K, screwing into said pipe, as herein set forth.

3. The combination, with an open-mouthed oil-can and a removable top, of a lever-pump arranged with the top, substantially as herein set forth.

4. The pin H, in combination with the removable depressed top, having the socket I, as and for the purpose set forth.

In testimony that I claim the foregoing I have hereunto set my hand and seal this 22d day of January, 1875.

JOHN D. GRAY. [L. S.]

Witnesses:

J. A. CAMPBELL,
DAVID INGRAM.